Dec. 17, 1929.          D. W. DORRANCE                1,740,230
                         ARTIFICIAL LIMB
              Original Filed Dec. 7, 1925    2 Sheets-Sheet 1
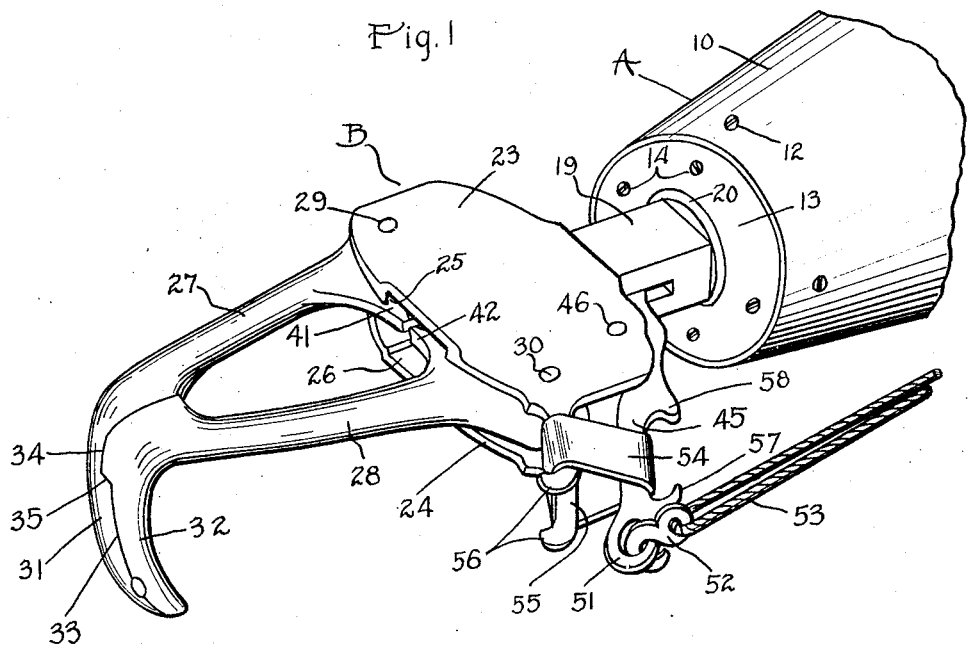
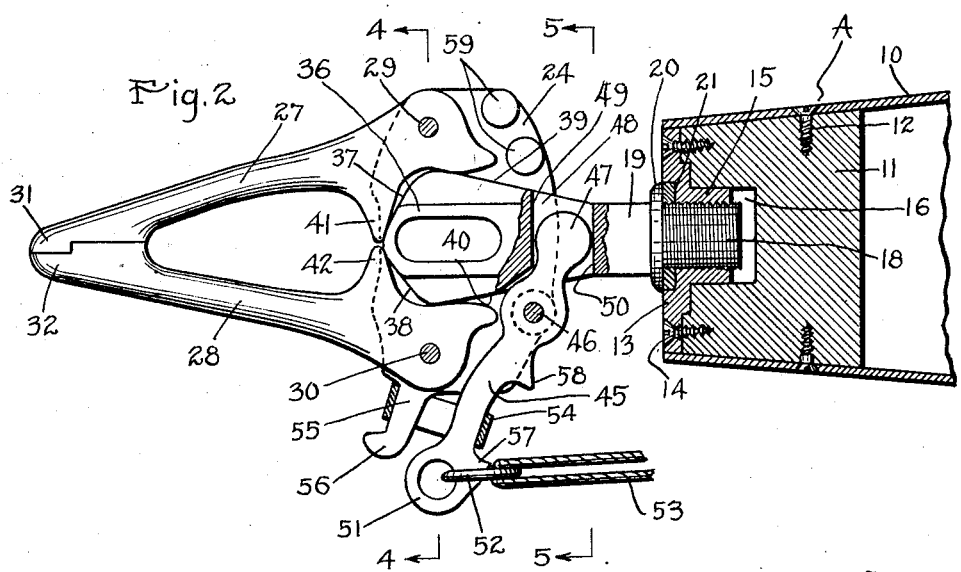
Inventor
David W. Dorrance
By Bradbury + Caswell
                              Attorneys Dec. 17, 1929.  D. W. DORRANCE  1,740,230
ARTIFICIAL LIMB
Original Filed Dec. 7, 1925    2 Sheets-Sheet 2
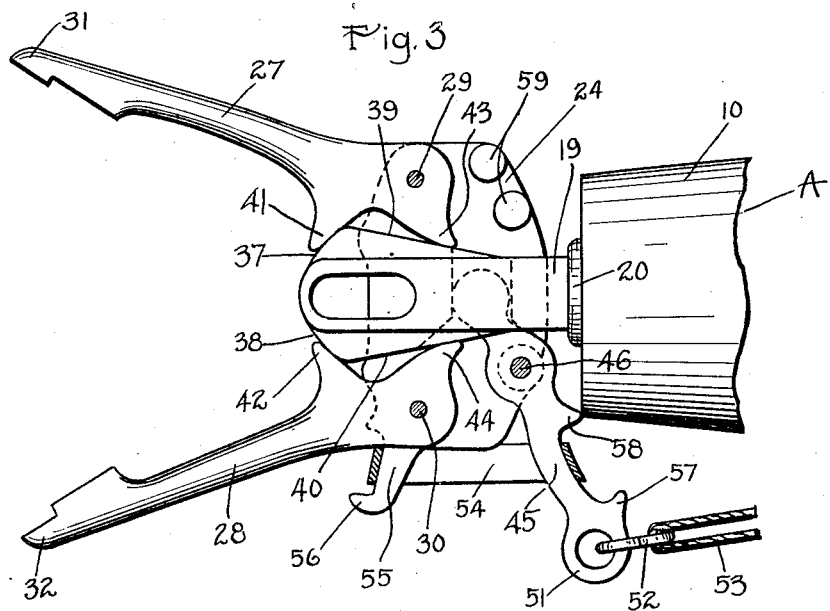
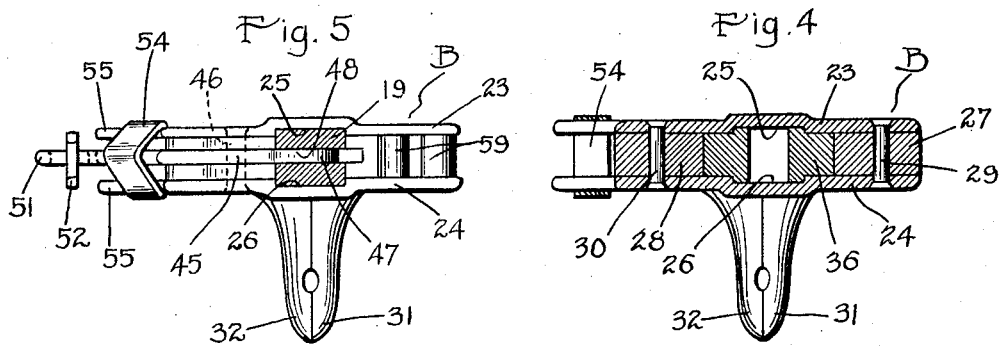
Inventor
David W. Dorrance
By Bradbury + Caswell
Attorneys Patented Dec. 17, 1929

1,740,230

UNITED STATES PATENT OFFICE

DAVID W. DORRANCE, OF MINNEAPOLIS, MINNESOTA

ARTIFICIAL LIMB

Application filed December 7, 1925, Serial No. 73,549. Renewed August 27, 1926.

My invention relates to improvements in artificial limbs of the type comprising an arm-stump socket, also a hand device attached thereto and including a pair of complementary fingers which are closed together by a tension member and spread apart by a pull-cord anchored to the shoulder of a user.

An object of the invention is to provide a simple, durable, and inexpensive article of the present nature, wherein a tension member operates through finger closing means which resists the spreading of the fingers in all of the relative positions thereof and together with said tension member keeps the fingers from spreading under stresses met in ordinary use and allows them to spread under unusual strains.

A further object is to provide an article, as above, wherein the fingers grip an object with firmness increasing with increasing force directed to pull said fingers from such object or to pull the object from said fingers.

A still further object of the invention resides in providing an arm stump socket fitted with a shank slidably carrying a frame upon which the fingers are pivoted.

Another object resides in providing the end of the shank with a cam head and in forming the fingers with cams adapted to cooperate with the cam head to produce the desired results.

An additional object of the invention resides in providing a lever to which the pull-cord is attached, said lever being pivoted to the frame and fulcrumed on the shank for moving the frame on said shank.

With the foregoing and other objects in view, which will appear in the following description, the invention resides in the novel combination and arrangement of parts and in the details of construction hereinafter described and claimed.

In the drawings illustrating my invention:

Fig. 1 is a perspective view of the invention showing the fingers closed.

Fig. 2 is a view of the structure shown in Fig. 1 with the upper supporting plate removed, said view being partly in plan and partly in section.

Fig. 3 is a view similar to Fig. 2 illustrating the fingers spread apart.

Fig. 4 is a sectional view taken on line 4—4 of Fig. 2.

Fig. 5 is a sectional view taken on line 5—5 of Fig. 2.

The invention may be comprehended readily by reference to the drawings, particularly Figs. 1 and 2, and to the following description. Although the improvement may be used with and attached to practically any type of arm stump socket, I have shown merely for the sake of illustration a socket A of a type well known in the art. This socket comprises a tubular shell 10 which has a block 11 fitted in the end thereof and secured thereto by means of screws 12. Upon the face of this block is secured a plate 13 which fits within the shell 10 and is secured to said block by screws 14. At the center of the plate 13 is provided a boss 15 which extends into a cavity 16 in block 11 and which is tapped to receive the threaded end 18 of a shank 19 which, as will soon appear, carries the major part of the mechanism embodying the invention. The shank 19 is formed with a flange 20 which provides a shoulder butting against a rubber washer 21 seated in an annular recess formed in plate 13. This washer permits of rotating the shank relative to the socket A and at the same time holds it by frictional engagement therewith in any angular position relative thereto. The method of attaching the socket A to an arm stump, not forming any part of the invention, has not been disclosed in the drawings though it readily can be understood that said socket may be attached to an arm stump by any of the devices now in common use for this purpose.

The frame of the illustrated device is indicated in its entirety at B, the same being mounted upon the shank 19 and comprising two spaced plates 23 and 24. The shank 19 is square in cross section as shown in Figs. 4 and 5 and slides in grooves 25 and 26 in said plates.

Between the plates 23 and 24 are positioned two fingers 27 and 28 which are pivoted to said plates by means of two rivets 29 and 30 passing through said plates and fingers. The fingers 27 and 28 are bowed outwardly as shown in Fig. 2 and the tips of the same are bent at right angles thereto, to form two hook portions 31 and 32. These hooks are semi-circular in cross section and are adapted to come together along a plane surface indicated at 33 (Fig. 1) to form, in effect, a single hook. As will be noted the plane of contact of the hooked portions 31 and 32 is offset at 34 to form a shoulder 35, against which the back of a knife blade or other object may bear when grasped between the fingers 27 and 28. With this arrangement and employing the frame B as a handle rest, such implements may be securely held and used with facility for their intended purposes.

Upon the shank 19 is formed a cam head 36 having front cam portions 37 and 38 and opposed side cam portions 39 and 40. These cam portions 37 and 38 engage opening cams 41 and 42 formed on the fingers 27 and 28 while the cam portions 39 and 40 engage closing cams 43 and 44 formed on said fingers. When the frame B is moved on the shank 19 toward the socket A, the cam portions 37 and 38 co-operate with the opening cams 41 and 42 and throw the fingers 27 and 28 apart bringing them into the relative position illustrated in Fig. 3 wherein the fingers are wide open. And, when said frame B is moved on the shank 19 away from the socket A, the cam portions 39 and 40 co-operate with the closing cams 43 and 44 and cause the fingers 27 and 28 to come together one against the other or to close upon an object placed between them. Any tendency of a grasped object to be pulled from the fingers 27 and 28 and any tendency of said fingers to be pulled from an object grasped thereby tends to move the frame away from the socket A, thus causing the cams 43 and 44 to coact with the cam portions 39 and 40 with the result that said fingers are drawn more firmly against the object. It, therefore, will be understood that the harder the pull tending to dislodge an object from said fingers the tighter will be the grip of the fingers upon said object. The cams of the device are so constructed that they are continuously in contact with their respective cam portions throughout the movement of the fingers, thereby preventing lost motion between the parts.

For sliding the frame B relative to shank 19 I employ a lever 45 which is pivoted between its ends to the plates 23 and 24 by means of a rivet 46. This lever is fulcrumed on the shank 19, a rounded head 47 on said lever playing within a slot 48 in the shank and abutting at opposite sides thereof against opposed shoulders 49 and 50 constituted by opposite walls of said slot. As said lever 45 is swung it causes the frame B with fingers 27 and 28 to be moved bodily relative to shank 19 at the same time swinging said fingers as previously described. At the free end of lever 45 is an eyelet 51 with which the pull-cord 53 is connected as by means of a hook 52 on said cord. The cord 53 as usual, is passed around the shoulder of a user and, pulling upon the lever 45 when the user's arm is straightened, swings said lever to retract the frame B on the shank 19 and open the fingers 27 and 28.

To cause the fingers to close together or upon an object, when the cord 53 is slackened, as by the crooking of the arm at the elbow, I employ a rubber band 54 which passes around the outer end of lever 45 and ears 55 issuing outwardly from the plates 23 and 24. Curved tips 56 on the ends of said ears and similar projections 57 and 58 formed on the lever 45 serve to hold the band 54 in place. It will be comprehended that any number of bands 54 may be used to produce as great a gripping effect in the fingers 27 and 28 as desired. The frame plates 23 and 24, are held in proper relation by means of the rivets 29, 30 and 46 and by the fingers 27 and 28 between said plates. Additionally, I employ two spacing blocks 59 between said plates 23 and 24, said blocks being opposite the pivot 46 of the lever 45. It will be noted that any strains set up against the shank 19 by forces operating upon the fingers and tending to spread the same are balanced by reason of the co-operation of the cams 43 and 44 with the opposed cam portions 39 and 40. It also will be observed that a relatively light band 54 will serve to clamp the fingers 27 and 28 firmly together or against an object placed between them. This is due to the relatively great leverage afforded by the fulcrumed lever 45 in advancing the frame B on the shank 19 and to the relative low pitch of the cam portions 39 and 40, which coact with the finger closing cams 43 and 44 of the fingers 27 and 28. In this connection, attention is invited to another important feature of the invention, which resides in the holding of the fingers 27 and 28, in any and all of their relative positions, against spreading under ordinary strains. The rubber band 54, of course, acts to prevent such spreading of the fingers, but unaided, it might be necessary that it be so strong as to require most burdensome pulls upon the cord 53. The action of said band, however, is supplemented in its tendency to counter the spreading of said fingers 27 and 28 by the coaction of the cams 43 and 44 with the cam portions 39 and 40. Noting the direction in which force is applied to said cam portions by said cams, it readily will be comprehended that the force resulting from strains tending to spread the fingers 27 and 28 and at the same time operating to retract the frame B on the shank 19 will be relatively small as compared with the finger spreading force experienced. Such small force encountered in the ordinary uses of the device are effectively countered by one or more rubber bands 54, so that to all intents and purposes the fingers 27 and 28 are locked against spreading by extraneous force. Unusual strains tending to spread the fingers apart and sufficiently great to injure the device or the wearer are compensated for in the retraction of the frame B on the shank 19 and the swinging of the lever 45 against the action of the band 54. Thus, it will be understood, that the fingers of the device will be kept from spreading under strains within a given limit by using a band or bands of relatively little though appropriate strength.

This improvement is advantageous in that it is easily actuated and serves securely and effectively to hold and grip objects upon which it is desired to operate. The action of the fingers is one that may be termed a "follow-up" grip and, as before stated, this "follow-up" grip normally cannot be broken, in any relative position of the fingers as by the spreading thereof under extraneous forces directed thereagainst.

Changes in the specific form of my invention, as herein disclosed, may be made within the scope of what is claimed without departing from the spirit of my invention.

Having described my invention, what I claim as new and desire to protect by Letters Patent is:

1. In an article of the class described, a shank for attachment to an arm-stump socket, a frame slidably mounted on the shank, a pair of complementing fingers pivoted on the frame, each finger having an opening cam and a closing cam thereon, said shank being formed with cam portions, one for each cam of each finger, the opening cams and their respective cam portions co-operating to spread the fingers apart upon movement of the frame in one direction on the shank, the closing cams and their respective cam portions co-operating to swing the fingers together upon reverse movement of said frame on said shank, means for moving the frame forth and back on the shank, the same including a lever slidably fulcrumed at its inner end on the shank and pivoted between its ends to the frame, a yielding tension member stretched between the frame and the outer end of said lever, said member operating to shift the frame on the shank in a direction to close the fingers, and a pull cord attached to said outer end of said lever for swinging the same against the action of said tension member and to move the frame on the shank in a direction to open the fingers, said closing cams and their respective cam portions on the shank further co-operating to resist spreading movement of the fingers in any relative position thereof, except by movement of the frame in appropriate direction on the shank.

2. In an article of the class described, a shank for attachment to an arm-stump socket, said shank formed with two opposed cam portions, a frame movably mounted on the shank, a pair of complementing fingers pivoted on the frame, each finger having a cam thereon co-operating with one of said cam portions and serving to swing its respective finger toward the other finger upon movement of the frame in one direction upon the shank, also to resist the opening movement of said finger against extraneous forces tending to open the same, means for swinging the fingers apart upon the return movement of the frame on said shank, and means for moving said frame forth and back on the shank.

3. In an article of the class described, a shank for attachment to an arm-stump socket, said shank formed with two opposed cam portions, a frame movably mounted on the shank, a pair of complementing fingers pivoted on the frame, each finger having a cam thereon co-operating with one of said cam portions and serving to swing its respective finger toward the other finger upon movement of the frame in one direction on the shank, also to resist the opening movement of said finger against extraneous forces tending to open the same, a lever fulcrumed on the shank and connected with said frame, a yielding tension member interposed between frame and lever for shifting the latter to move said frame in finger closing direction on the shank, a pull-cord connected with the lever to swing the same against the action of said tension member and thereby move said frame in a reverse direction on the shank, and means for spreading the fingers apart upon such movement of said frame on said shank.

4. In an article of the class described, a shank for attachment to an arm-stump socket, said shank formed with a cam portion, a frame movably mounted on the shank, means for moving the frame forth and back on said shank, a pair of complementing fingers on the frame, one finger being pivoted thereon, a cam on the pivoted finger co-operating with said cam portion to swing the pivoted finger in closing direction toward the other finger upon movement of the frame in one direction on said shank, also to resist the opening movement of said pivoted finger by extraneous forces tending to open the same, and means to swing said pivoted finger in finger opening direction upon reverse movement of the frame on said shank.

5. In an article of the class described, a shank for attachment to an arm-stump socket, said shank formed with a cam portion, a frame movably mounted on the shank, a pair of complementing fingers on the frame, one finger being pivoted thereon, a cam on the pivoted finger co-operating with said cam portion to swing the pivoted finger in closing direction toward the other finger upon movement of the frame in one direction on said shank, also to resist the opening movement of said pivoted finger by extraneous forces tending to open the same, a lever fulcrumed on the shank and connected with said frame, a yielding tension member interposed between frame and lever for shifting the latter to move said frame in finger closing direction, and means connected with the lever for swinging the same against the action of said tension member to move said frame in an opposite direction on said shank.

6. In an article of the class described, a shank for attachment to an arm-stump socket, said shank being formed with an elongated cam portion thereon, a frame movably mounted on said shank, a pair of complementing fingers on the frame, one pivoted thereon, a cam on the pivoted finger, means for moving the frame on the shank, said cam co-operating with said cam portion, throughout the movement of said frame in one direction on said shank, to swing the pivoted finger toward the other finger, also to resist reverse movement of said finger by extraneous force in any position thereof with respect to said other finger.

7. In an article of the class described, a shank for attachment to an arm-stump socket, said shank being formed with a cam portion thereon, a frame movably mounted on said shank, a pair of complementing fingers on the frame, one being pivoted thereon, a cam on the pivoted finger, said cam co-operating with said cam portion to swing the pivoted finger toward the other finger upon movement of the frame in one direction on said shank, also to set up resistance against reverse movement of said pivoted finger by extraneous forces, and means for moving said frame on said shank.

8. In an article of the class described, a shank for attachment to an arm-stump socket, said shank being formed with a pair of cam portions thereon, a frame movably mounted on said shank, a pair of complementing fingers on the frame, one finger being pivoted thereon, a pair of cams on the pivoted finger, one cam co-operating with one cam portion on the shank to swing the pivoted finger away from said other finger, when the frame is moved in one direction on the shank, the second cam co-operating with the second cam portion to swing said pivoted finger toward said second finger, when the frame is reversely moved on the shank, also to resist such closing movement of said pivoted finger by extraneous force, and means for moving said frame on said shank.

9. In an article of the class described, a shank for attachment to an arm-stump socket, a frame slidable on said shank, a pair of complementary fingers on the frame, one being pivoted thereon and co-operating with said shank, said finger being swung away from the other finger upon movement of the frame in one direction on the shank and swung toward said other finger upon reverse movement of the frame, and means for reciprocating said frame in said shank.

10. In an article of the class described, a shank for attachment to an arm-stump socket, a frame slidable on said shank, a pair of complementary fingers pivoted on said frame, and co-operating with said shank, said fingers being swung apart upon movement of the frame in one direction on said shank and swung together upon the reverse movement of said frame, and means for reciprocating said frame on said shank.

11. In an article of the class described, a shank for attachment to an arm-stump socket, a frame slidable on said shank, a pair of complementary fingers on the frame, one finger being pivoted thereon and co-operating with said shank, said finger being swung with respect to the other finger upon movement of the frame on said shank, and means for sliding said frame on said shank.

12. An article of the class described including two relatively movable members, one of said members being adapted to be attached to an arm stump socket, a pair of complementary fingers on one of said members, one finger being pivoted to said member, the other member having a cam portion thereon, a cam on the pivoted finger, said cam co-operating with said cam portion to cause the swinging of the pivoted finger toward the other finger upon relative movement between said members in one direction, also to set up resistance against reverse movement of said pivoted finger by extraneous forces, and means to cause reverse relative movements between said elements.

13. An article of the class described, including two relatively movable members, one of said members being adapted to be attached to an arm stump socket, a pair of complementary fingers on one of said members, one finger being pivoted to said member, the other member having oppositely disposed cam portions thereon, cams on the pivoted finger co-operating with said cam portions to cause the swinging of the pivoted finger toward and away from the other finger upon reverse relative movement between said members, one of said cam portions and one of said cams serving to set up resistance against opening movement of said pivoted finger by extraneous forces, and means for causing reverse relative movements between said elements.

14. A device for the purpose indicated comprising a member provided with a pivotally mounted finger, an actuator axially movable with respect to the pivot of said finger, and cooperating elements carried respectively by the finger and the actuator and effecting rocking movement of the finger upon a force applied to the actuator but precluding any movement of the actuator by a force applied to the finger.

15. A device for the purpose indicated comprising a member provided with a pivotally mounted finger, an actuator mounted for axial movement relative to said member and the pivot of said finger, and cooperating elements carried respectively by the actuator and finger for effecting rocking movement of the latter in infinitesimal increments when a force is applied to the actuator and simultaneously locking the finger against reverse movement as a result of a force applied to the finger.

In testimony whereof, I have signed my name to this specification.

DAVID W. DORRANCE.